United States Patent
Satou et al.

(10) Patent No.: US 9,426,645 B2
(45) Date of Patent: Aug. 23, 2016

(54) RECEIVER DEVICE

(71) Applicant: Sharp Kabushiki Kaisha, Osaka-shi, Osaka (JP)

(72) Inventors: Michiaki Satou, Osaka (JP); Kosuke Yamamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/438,318

(22) PCT Filed: Oct. 25, 2013

(86) PCT No.: PCT/JP2013/078984
§ 371 (c)(1),
(2) Date: Apr. 24, 2015

(87) PCT Pub. No.: WO2014/069368
PCT Pub. Date: May 8, 2014

(65) Prior Publication Data
US 2015/0281944 A1    Oct. 1, 2015

(30) Foreign Application Priority Data
Oct. 30, 2012  (JP) ................. 2012-239047

(51) Int. Cl.
| H04B 1/06 | (2006.01) |
| H04W 8/22 | (2009.01) |
| H04R 3/12 | (2006.01) |
| H04M 1/60 | (2006.01) |

(52) U.S. Cl.
CPC ............ *H04W 8/22* (2013.01); *H04M 1/605* (2013.01); *H04R 3/12* (2013.01); *H04M 2203/2094* (2013.01); *H04M 2250/12* (2013.01); *H04M 2250/22* (2013.01); *H04R 2420/03* (2013.01); *H04R 2460/01* (2013.01); *H04R 2460/13* (2013.01); *H04R 2499/11* (2013.01)

(58) Field of Classification Search
CPC ................... H04M 1/605; H04M 2203/2094; H04M 2250/12; H04M 2250/22; H04R 2420/03; H04R 2460/01; H04R 2460/13; H04R 2499/11; H04R 3/12; H04W 8/22
USPC ...... 455/566, 563, 550.1, 570, 67.13, 569.1; 381/151, 71.11, 316, 326, 317, 381, 381/311, 375, 376; 704/228; 345/204, 173
See application file for complete search history.

(56) References Cited

U.S. PATENT DOCUMENTS

| 6,483,917 B1 * | 11/2002 | Kang ...................... H04M 1/05 379/430 |
| 7,283,850 B2 * | 10/2007 | Granovetter .......... G06F 17/289 381/122 |
| 9,226,075 B2 * | 12/2015 | Lee .......................... H04R 9/02 |
| 2005/0114124 A1 * | 5/2005 | Liu ...................... G10L 21/0208 704/228 |
| 2005/0286734 A1 * | 12/2005 | Wang ...................... G02C 11/06 381/381 |

(Continued)

FOREIGN PATENT DOCUMENTS

| JP | 2007-019898 A | 1/2007 |
| JP | 4541111 B2 | 9/2010 |

(Continued)

*Primary Examiner* — Tan H Trinh
(74) *Attorney, Agent, or Firm* — Keating & Bennett, LLP (57) ABSTRACT

A receiver device (1) of the present invention switches between a bone conduction receiver (16) and an air conduction receiver (17) depending on an area or a shape of a contact region of a touch panel (10) provided in the receiver device (1) which region is in contact with a user.

6 Claims, 4 Drawing Sheets

(56) References Cited

U.S. PATENT DOCUMENTS

| | | | |
|---|---|---|---|
| 2006/0079291 A1* | 4/2006 | Granovetter | G06F 17/289 455/563 |
| 2006/0111093 A1* | 5/2006 | Shim | G06F 1/1626 455/418 |
| 2007/0036370 A1* | 2/2007 | Granovetter | G06F 17/289 381/311 |
| 2007/0261491 A1* | 11/2007 | Nojima | A61B 5/121 73/585 |
| 2010/0040249 A1* | 2/2010 | Lenhardt | H04R 25/502 381/316 |
| 2010/0272304 A1* | 10/2010 | Thiel | G02C 3/003 381/375 |
| 2011/0298740 A1* | 12/2011 | Miyazaki | G06F 1/1633 345/173 |
| 2013/0076709 A1* | 3/2013 | Cha | G06F 1/1632 345/204 |
| 2013/0137491 A1* | 5/2013 | Tanaka | H04W 52/00 455/569.1 |
| 2013/0308798 A1* | 11/2013 | Lee | H04M 1/03 381/151 |
| 2015/0181338 A1* | 6/2015 | Hosoi | H04R 5/033 381/309 |
| 2015/0256656 A1* | 9/2015 | Horii | H04M 1/0202 455/575.1 |

FOREIGN PATENT DOCUMENTS

| | | | | |
|---|---|---|---|---|
| JP | 2012-109663 A | 6/2012 | | |
| WO | WO 2012/105735 A1 * | 8/2012 | | H04R 2460/13 |

* cited by examiner

RECEIVER DEVICE

TECHNICAL FIELD

The present invention relates to a receiver device including (i) an air conduction receiver which allows a user to receive a phone call by air conduction and (ii) a bone conduction receiver which allows the user to receive the phone call by bone conduction.

BACKGROUND ART

Normally, in a case where (a) a receiver device includes (i) an air conduction receiver which allows a user to receive a phone call by air conduction and (ii) a bone conduction receiver which allows the user to receive the phone call by bone conduction and (b) the user uses the bone conduction receiver, the user listens to a sound by bringing the receiver device into contact with a user's ear or a part of a vicinity of the user's ear. In this case, since the user listens to the sound directly from a contact part of the user's ear or the part of the vicinity of the user's ear which part is in contact with the receiver device, it is possible to correctly hear the sound irrespective of external environment, even in a case where an acoustic pressure is low.

On the other hand, in a case where the user uses the air conduction receiver of the receiver device, the user does not listen to the sound directly from the contact part of the user's ear or the part of the vicinity of the user's ear which part is in contact with the receiver device, but listens to the sound by spatial vibration. Therefore, the sound is likely to be affected by the external environment. In a case where an external sound is loud, it may not be possible to listen to the sound unless the acoustic pressure is increased.

Furthermore, a sound audible by bone conduction is generally different, in characteristics such as a frequency characteristic and clarity (acoustic parameter), from a sound audible by air conduction. Therefore, it is necessary to separately and properly set the bone conduction receiver, depending on characteristics of a sound audible by bone conduction, so that the sound is easily audible from the bone conduction receiver. Similarly, it is necessary to separately and properly set the air conduction receiver, depending on characteristics of a sound audible by air conduction, so that the sound is easily audible from the air conduction receiver.

Various techniques have been thus suggested which cause a sound to be easily audible from each of the air conduction receiver and the bone conduction receiver.

For example, Patent Literature 1 discloses a technique of switching between a bone conduction filter characteristic and an air conduction filter characteristic, depending on volume, so that a sound is easily audible from any one of a bone conduction receiver and an air conduction receiver.

Patent Literature 2 discloses a patent related to how to use a terminal in which a bone conduction speaker and an air conduction speaker are realized by an identical element. This is a technique based on a characteristic of a bone conduction terminal such that audibility varies depending on a pressure of the bone conduction terminal to an ear, and is a technique of changing a ratio between a bone conduction sound and an air conduction sound by manually changing the pressure to bone.

Further, Patent Literature 3 discloses a technique of (i) providing, to a terminal, a bone conduction receiver, an air conduction receiver, and a pressure sensor and (ii) changing a ratio between a sound audible from the bone conduction receiver and a sound audible from the air conduction receiver depending on a pressure.

CITATION LIST

Patent Literature 1
Japanese Patent Application Publication, Tokukai, No. 2007-19898 A (Publication Date: Jan. 25, 2007)
Patent Literature 2
Japanese Patent No. 4541111 B (Publication Date: Sep. 8, 2010)
Patent Literature 3
Japanese Patent Application Publication, Tokukai, No. 2012-109663 A (Publication Date: Jun. 7, 2012)

SUMMARY OF INVENTION

Technical Problem

Each of Patent Literatures 1 through 3 causes a sound to be easily audible from each receiver. However, various problems arise as follows, in a case where (i) a function for causing the user to listen to a bone conduction sound and (ii) a function for causing the user to listen to an air conduction sound are switched.

In a case of Patent Literature 1, (i) a function for causing a user to listen to a bone conduction sound and (ii) a function for causing the user to listen to an air conduction sound are switched depending on setting of a volume key. Therefore, an unintended one of the functions may be set, in a case where the user operates the volume key so as to adjust volume.

In a case of Patent Literature 2, (i) a function for causing a user to listen to a bone conduction sound and (ii) a function for causing the user to listen to an air conduction sound are switched by the user manually switching a pressure applied to a bone so that a ratio between the bone conduction sound and the air conduction sound is changed. In this case, since the ratio between the bone conduction sound and the air conduction sound is changed only depending on the pressure applied to the bone, a problem arises such that it is not possible to set suitable values of sounds in the respective functions.

In a case of Patent Literature 3, (i) a function for causing a user to listen to a bone conduction sound and (ii) a function for causing the user to listen to an air conduction sound are switched by changing a ratio between the bone conduction sound and the air conduction sound depending on a pressure detected by the pressure sensor. In this case, since it is necessary to additionally provide the pressure sensor to a device, a problem arises such that the device becomes complicated and large-sized.

The present invention has been made in view of the above problems, and the object of the present invention is to provide a receiver device capable of, despite having a simple configuration, (a) properly switching between (i) a function (bone conduction receiver) for causing a user to listen to a bone conduction sound and (ii) a function (air conduction receiver) for causing the user to listen to an air conduction sound and (b) setting the functions so that the user can suitably listen to the bone conduction sound and the air conduction sound.

Solution to Problem

In order to attain the above object, a receiver device in accordance with an aspect of the present invention is a receiver device capable of switching between (i) an air conduction receiver function for causing a user to receive a phone call by air conduction and (ii) a bone conduction receiver function for causing the user to receive the phone call by bone conduction, including: a receiver member which sets the receiver device to a state where the user can receive the phone call by use of the air conduction receiver function or the bone conduction receiver function, in a case where the user brings the receiver device into contact with a vicinity of a user's ear; and a receiver control section including: a contact region specifying section which specifies a contact region of the receiver member which region is in contact with the user, while the receiver device is being set, by the receiver member, to the state where the user can receive the phone call; and a receiver function switching section which switches to one of the air conduction receiver function and the bone conduction receiver function which one is associated with the contact region specified by the contact region specifying section.

Advantageous Effects of Invention

According to an aspect of the present invention, it is possible to, with a simple configuration, (a) properly switch between (i) a function (bone conduction receiver) for causing a user to listen to a bone conduction sound and (ii) a function (air conduction receiver) for causing the user to listen to an air conduction sound and (b) set the functions so that the user can easily listen to the bone conduction sound and the air conduction sound.

DESCRIPTION OF EMBODIMENTS

Embodiment

The following description will discuss an embodiment of the present invention. Note that the present embodiment will describe a receiver device applied to a smartphone which is generally provided with a touch panel.

<Schematic Configuration of Receiver Device 1>

Figure 1:
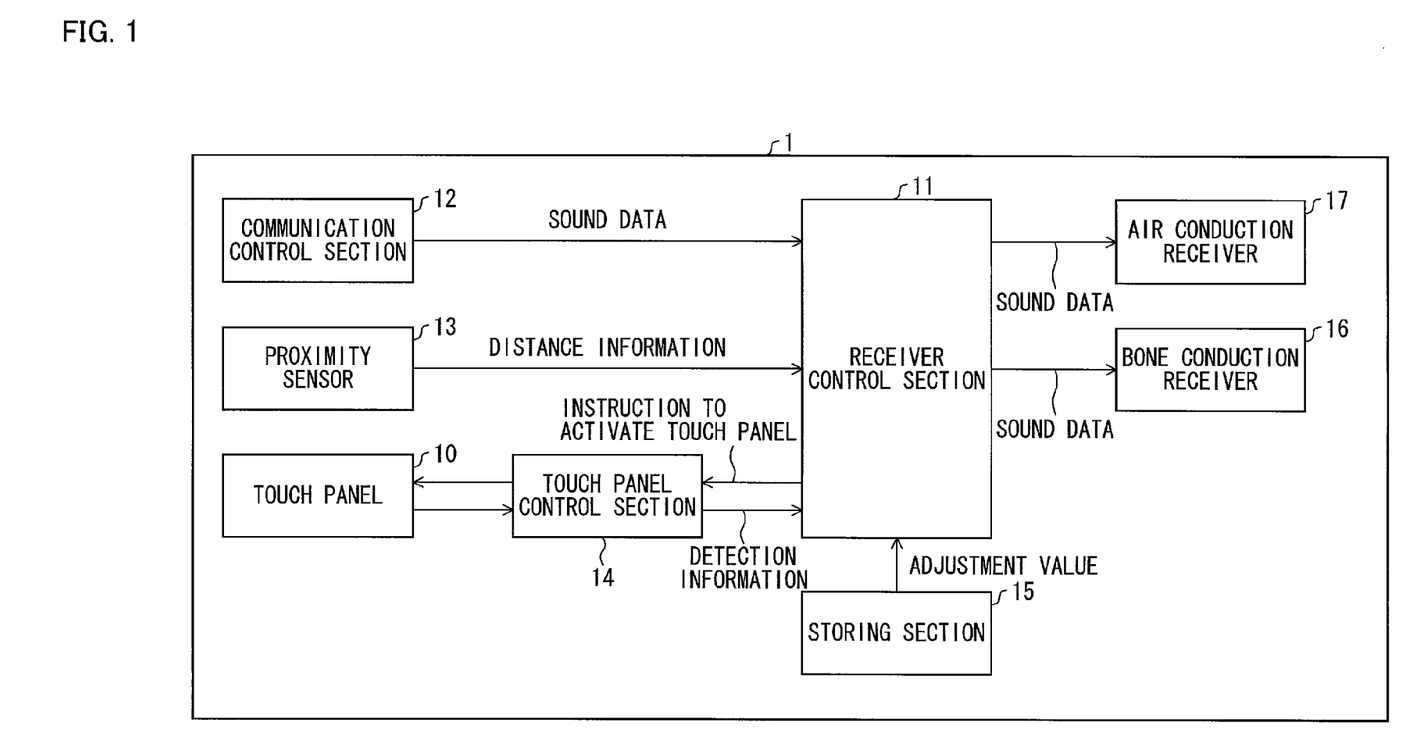
FIG. 1 is a block diagram schematically illustrating a configuration of a receiver device in accordance with an embodiment of the present invention.

FIG. 1 is a block diagram schematically illustrating a configuration of a receiver device 1 in accordance with the present embodiment.

The receiver device 1 is a device capable of switching between (i) an air conduction receiver function for causing a user to receive a phone call by air conduction and (ii) a bone conduction receiver function for causing the user to receive the phone call by bone conduction. As illustrated in FIG. 1, the receiver device 1 includes a touch panel (receiver member) 10 and a receiver control section 11. The receiver device 1 further includes, around the receiver control section 11, a communication control section 12, a proximity sensor 13, a touch panel control section 14, a storing section 15, a bone conduction receiver 16, and an air conduction receiver 17.

The touch panel 10 functions as a display section, an input interface, and a receiver member which detects a region of the touch panel 10 which region is in contact with a vicinity of a user's ear. The touch panel 10 supplies, to the touch panel control section 14 which controls activation of the touch panel 10, information (a coordinate value) in accordance with which such a contact region is specified.

The receiver control section 11 is a control device which is made up of a CPU and the like and which controls each section of the receiver device 1. How the receiver control section 11 carries out such receiver control will be later described in detail.

The communication control section 12, during a phone call, extracts, from a communication radio wave received from a base station, sound data which the receiver device 1 is to receive. The communication control section 12 transmits the sound data to the receiver control section 11.

The proximity sensor 13 measures a distance between the user and the receiver device 1, and transmits a value thus measured (detected value) to the receiver control section 11 as distance information. Normally, the proximity sensor 13 is provided on the touch panel 10, and measures a distance between the user and the touch panel 10.

The touch panel control section 14 receives an instruction to activate the touch panel 10 from the receiver control section 11, activates the touch panel 10, detects a contact region X of the touch panel 10 thus activated which region is in contact with the user, and transmits detection information to the receiver control section 11.

The storing section 15 stores therein an adjustment value in accordance with which an acoustic parameter of each of the bone conduction receiver 16 and the air conduction receiver 17 is adjusted. The adjustment value is read out by the receiver control section 11 as necessary.

Note here that the acoustic parameter indicates characteristics, such as a frequency characteristic and clarity, with which a sound is transmitted. The adjustment value is a value in accordance with which the acoustic parameter, indicative of the characteristics such as a frequency characteristic and clarity, of each of the bone conduction receiver 16 and the air conduction receiver 17 is adjusted so that the user listens to a sound that is suitably set.

The storing section 15 can alternatively store a pattern (later described) of a shape of a contact region of the touch panel 10 which region is in contact with the user.

The bone conduction receiver 16 receives sound data from the receiver control section 11, and realizes the bone conduction receiver function of the receiver device 1.

The air conduction receiver 17 receives sound data from the receiver control section 11, and realizes the air conduction receiver function of the receiver device 1.

How the receiver control section 11 of the receiver device 1 carries out the receiver control will be described below.

Here, before the receiver control section 11 is described, the bone conduction receiver function and the air conduction receiver function will be described.

(Bone Conduction Receiver Function, Air Conduction Receiver Function)

As described above, the receiver device 1 having the aforementioned configuration includes (i) the bone conduction receiver 16 which realizes the bone conduction receiver function for causing a user to receive a phone call by bone conduction and (ii) the air conduction receiver 17 which realizes the air conduction receiver function for causing the user to receive the phone call by air conduction.

Figure 3:
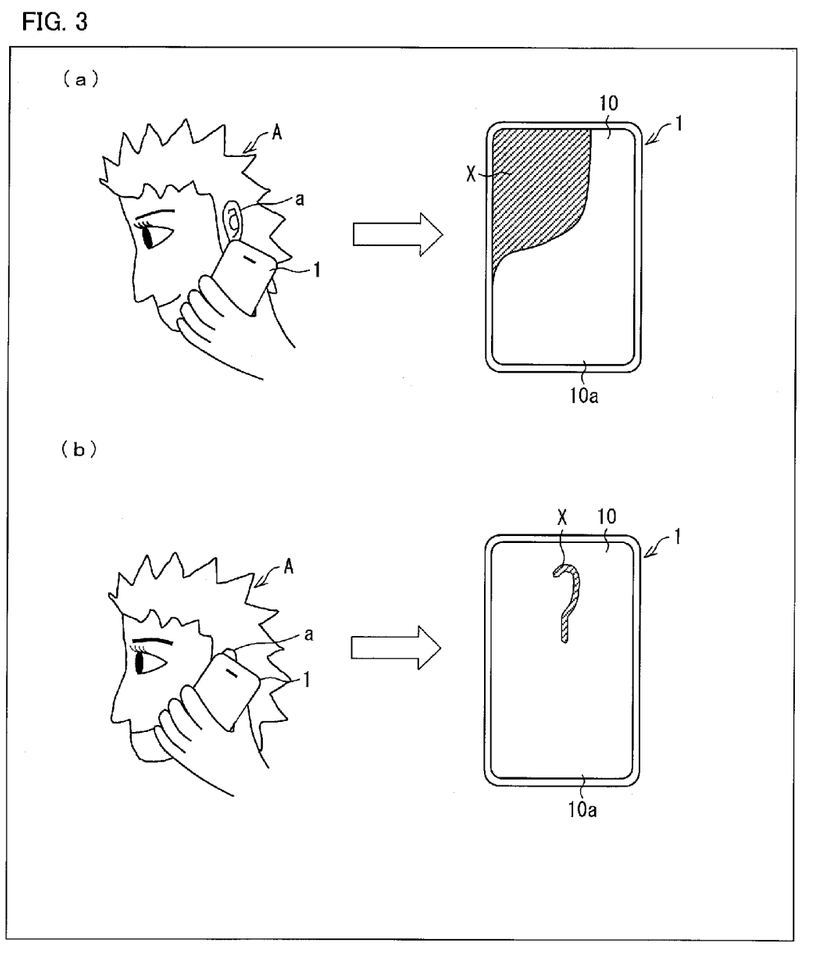
FIG. 3 illustrates a contact region of a touch panel included in the receiver device illustrated in FIG. 1 which region is in contact with a user. (a) of FIG. 3 is a view illustrating a region of the touch panel which region is in contact with the user in a case where a bone conduction receiver function is realized. (b) of FIG. 3 is a view illustrating a region of the touch panel which region is in contact with the user in a case where an air conduction receiver function is realized.

The bone conduction receiver function realized with the use of the bone conduction receiver 16 is realized by bringing the touch panel 10 of the receiver device 1 into contact with a position slightly away from a user A's ear "a" (vicinity of the user A's ear "a"), for example, as illustrated in (a) of FIG. 3. In this case, a contact region X specified on the touch panel 10 of the receiver device 1, which region is in contact with the user A, is large in proportion with respect to an entire region of a touch surface 10a of the touch panel 10.

On the other hand, the air conduction receiver function realized with the use of the air conduction receiver 17 is realized by bringing the touch panel 10 of the receiver device 1 into contact with a position close to the user A's ear "a" (the vicinity of the user A's ear "a"), for example, as illustrated in (b) of FIG. 3. In this case, a contact region X specified on the touch panel 10 of the receiver device 1, which region is in contact with the user A, is small in proportion with respect to the entire region of the touch surface 10a of the touch panel 10.

The proportion of the contact region X with respect to the entire region of the touch surface 10a does not need to be fixed, and can be set as appropriate.

The bone conduction receiver 16 and the air conduction receiver 17 are different in acoustic characteristic. Therefore, in a case where the bone conduction receiver function and the air conduction receiver function are realized, it is necessary to suitably adjust the acoustic parameter of each of the bone conduction receiver 16 and the air conduction receiver 17 so that the user easily listens to a sound. Such adjustment is made in accordance with the adjustment value stored in the storing section 15.

(Receiver Control Section 11)

Figure 2:
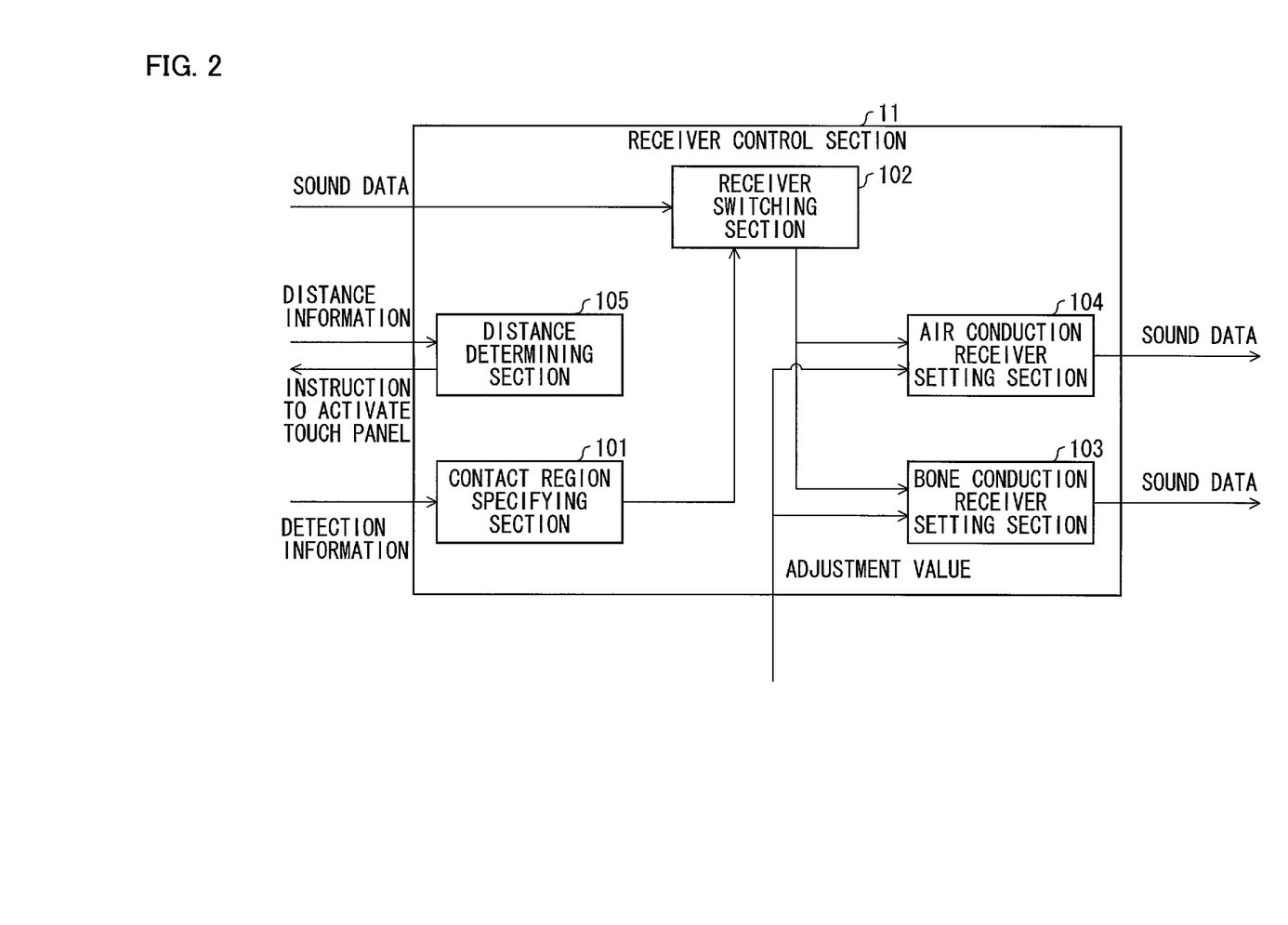
FIG. 2 is a block diagram schematically illustrating a configuration of a receiver control section included in the receiver device illustrated in FIG. 1.

FIG. 2 is a block diagram schematically illustrating a configuration of the receiver control section 11.

As illustrated in FIG. 2, the receiver control section 11 includes a contact region specifying section 101, a receiver switching section 102, a bone conduction receiver setting section 103, an air conduction receiver setting section 104, and a distance determining section 105.

The contact region specifying section 101 specifies a contact region of the touch panel 10 which region is in contact with the user, with reference to detection information supplied from the touch panel control section 14 illustrated in FIG. 1. Information on the contact region thus specified is transmitted to the receiver switching section 102. Note there that such a specified contact region indicates, for example, the contact region X illustrated in (a) or (b) of FIG. 3 and described above. Information such as positional (coordinate) information on the contact region X is transmitted to the receiver switching section 102.

The receiver switching section 102 determines which one of the bone conduction receiver 16 and the air conduction receiver 17 to operate, with reference to the information on the contact region (for example, the contact region X illustrated in (a) or (b) of FIG. 3) which information is received from the contact region specifying section 101. That is, the receiver switching section 102 switches to one of the air conduction receiver 17 and the bone conduction receiver 16 which one is associated with the contact region X specified by the contact region specifying section 101.

Specifically, the receiver switching section 102 switches to one of the air conduction receiver 17 and the bone conduction receiver 16 which one is associated with an area of the contact region X.

In the present embodiment, the receiver switching section 102 determines whether the area of the contact region X is equal to or larger than a predetermined area. In a case where the area of the contact region X is equal to or larger than the predetermined area, the receiver switching section 102 activates the bone conduction receiver 16. In a case where the area of the contact region X is smaller than the predetermined area, the receiver switching section 102 activates the air conduction receiver 17.

Note that the receiver switching section 102 switches between the bone conduction receiver 16 and the air conduction receiver 17 depending on the area of the contact region X, but the receiver switching section 102 can alternatively switch between the bone conduction receiver 16 and the air conduction receiver 17 depending on a shape of the contact region X.

In this case, the receiver switching section 102 switches to one of the bone conduction receiver 16 and the air conduction receiver 17 which one is associated with, among a plurality of shapes registered in advance, a shape that is determined as being similar to the shape of the contact region X which shape is formed by coordinates included in the contact region X. In the present embodiment, in a case where 80% or more of the coordinates included in the contact region X match with coordinates of any one of the plurality of shapes registered in advance, it is determined that the any one of the plurality of shapes is similar to the shape of the contact region X.

As the plurality of shapes registered in advance, it is preferable to employ shapes obtained from contact regions which are detected (i) in a case where the user, who is to use the receiver device 1, actually brings the touch panel into contact with the vicinity of the user's ear so that the bone conduction receiver 16 is in use and (ii) in a case where the user actually brings the touch panel into contact with the vicinity of the user's ear so that the air conduction receiver 17 is in use.

The receiver switching section 102 thus switches between the bone conduction receiver 16 and the air conduction receiver 17. In a case where the receiver switching section 102 activates the bone conduction receiver 16, the receiver switching section 102 transmits, to the bone conduction receiver setting section 103, sound data received from the communication control section 12. In a case where the receiver switching section 102 activates the air conduction receiver 17, the receiver switching section 102 transmits, to the air conduction receiver setting section 104, sound data received from the communication control section 12.

The bone conduction receiver setting section 103 reads out, from the storing section 15 illustrated in FIG. 1, an adjustment value necessary for causing the receiver device 1 illustrated in FIG. 1 to suitably operate as the bone conduction receiver 16. The bone conduction receiver setting section 103 then adjust the acoustic parameter of the bone conduction receiver 16 in accordance with the adjustment value.

Therefore, with the use of the bone conduction receiver 16 whose acoustic parameter is adjusted so that the user can easily listen to a sound, it is possible to convey, to the user, a sound suitable for the bone conduction receiver function.

The air conduction receiver setting section 104 reads out, from the storing section 15 illustrated in FIG. 1, an adjustment value necessary for causing the receiver device 1 illustrated in FIG. 1 to operate as the air conduction receiver 17. The air conduction receiver setting section 104 then adjust the acoustic parameter of the air conduction receiver 17 in accordance with the adjustment value.

Therefore, with the use of the air conduction receiver 17 whose acoustic parameter is adjusted so that a user can easily listen to a sound, it is possible to convey, to the user, a sound suitable for the air conduction receiver function.

The distance determining section 105 determines a distance between the user A and the receiver device 1 with reference to distance information received from the proximity sensor 13 illustrated in FIG. 1, and transmits a result of such determination to the touch panel control section 14. The result of the determination is a result of determining whether or not the distance between the user A and the receiver device 1 (touch panel 10), which distance is contained in the distance information, is equal to or shorter than a predetermined distance.

The touch panel control section 14 transmits, to the touch panel 10, a control signal indicative of whether or not the touch panel is to be activated, in accordance with the result of the determination made by the distance determining section 105.

Note here that, in a case where the result of the determination made by the distance determining section 105 indicates that the distance between the user A and the receiver device 1 (touch panel 10) is equal to or shorter than the predetermined distance, the touch panel control section 14 transmits, to the touch panel 10, a control signal for causing the touch panel 10 to be activated.

(Receiver Control Process)

A receiver control process carried out by the receiver device 1 thus configured will be described below.

Figure 4:
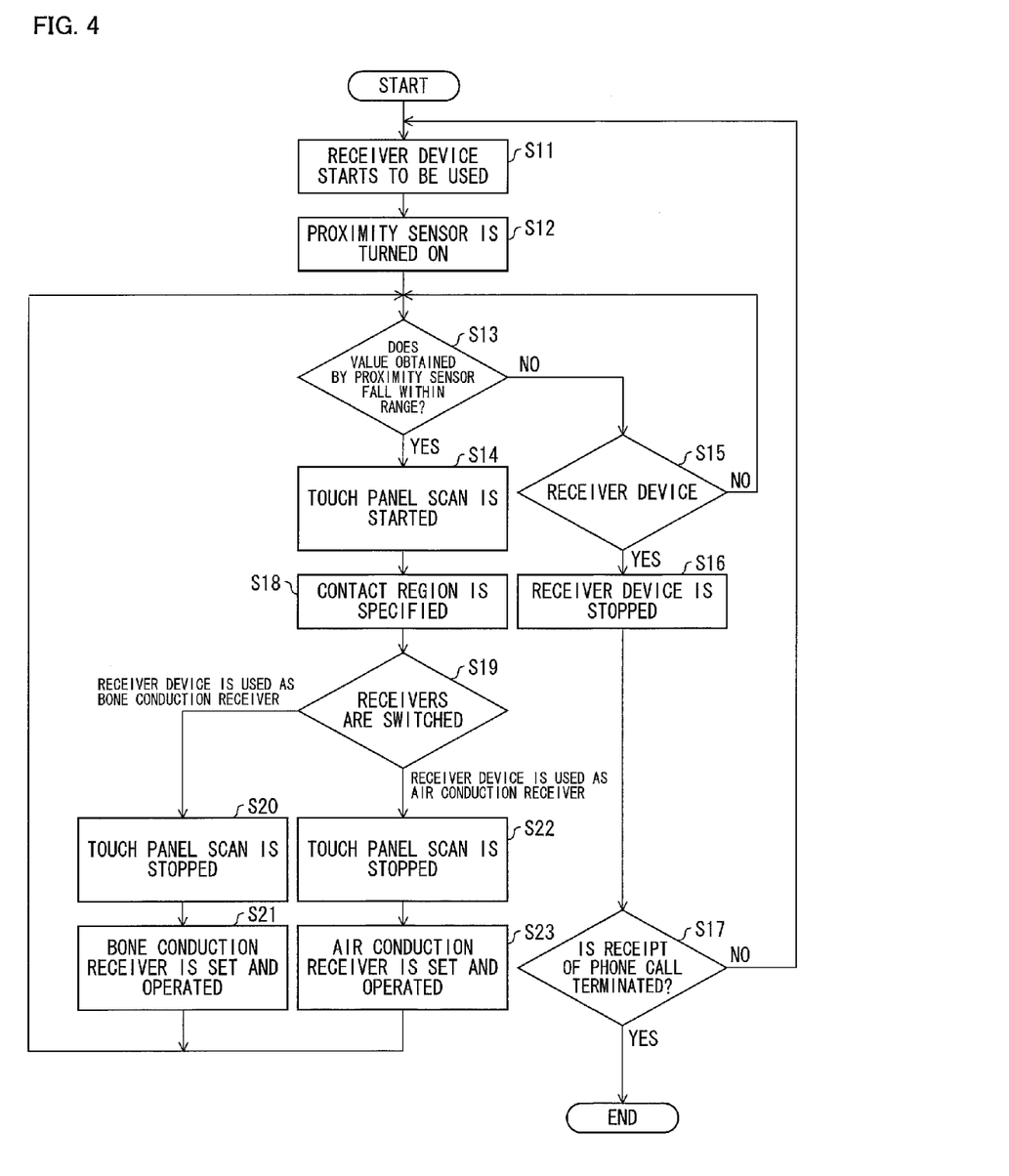
FIG. 4 is a flowchart illustrating how receiver functions are switched by the receiver device illustrated in FIG. 1.

FIG. 4 is a flowchart illustrating how the receiver control process is carried out by the receiver device 1.

First, the receiver device 1 starts to be used (step S11). In the present embodiment, the receiver control section 11 sets the receiver device 1 to a state where a user can receive a phone call, upon receipt of an instruction, from the user A, for the use of the receiver device 1.

Next, the proximity sensor 13 is turned on (step S12). In the present embodiment, the receiver control section 11 turns on the proximity sensor 13 in synchronization with the fact that the receiver device 1 starts to be used.

The receiver control section 11 then determines whether or not a value obtained by the proximity sensor 13 falls within a range (step S13). In the present embodiment, the receiver control section 11 determines, with reference to distance information supplied from the proximity sensor 13, whether or not a distance between the user A and the touch panel 10 is equal to or shorter than a threshold set in advance.

In a case where the receiver control section 11 determines that the value obtained by the proximity sensor 13 is equal to or less than the threshold (Yes, in the step S13), the receiver control section 11 proceeds to step S14 so as to cause the touch panel 10 to start a scan.

On the other hand, in a case where the receiver control section 11 determines that the value obtained by the proximity sensor 13 is greater than the threshold (No, in the step S13), the receiver control section 11 determines whether or not the use of the receiver device 1 is terminated (step S15). In a case where the receiver control section 11 determines that the use of the receiver device 1 is not terminated (No, in the step S15), the receiver control section 11 returns to the step S13. In a case where the receiver control section 11 determines that the use of the receiver device 1 is terminated (Yes, in the step S15), the receiver control section 11 stops the receiver device 1 (step S16), and then determines whether receipt of the phone call is terminated (step S17).

In a case where the receiver control section 11 determines, in the step S17, that the receipt of the phone call is terminated, the receiver control section 11 ends the process. In a case where the receiver control section 11 determines, in the step S17, that the receipt of the phone call is not terminated, the receiver control section 11 returns to the step S11 and continues to carries out the process.

In a case where the touch panel 10 starts the scan in the step S14, the receiver control section 11 specifies a contact region of the touch panel 10 which region is in contact with the user A (step S18). In the present embodiment, the contact region specifying section 101 specifies, with reference to detection information obtained from the touch panel 10, the contact region of the touch panel 10 which region is in contact with the user A.

Next, the receiver control section 11 switches between the air conduction receiver 17 and the bone conduction receiver 16 (step S19). In the present embodiment, the receiver switching section 102 of the receiver control section 11 switches to one of the air conduction receiver 17 and the bone conduction receiver 16 which one is associated with the contact region X specified by the contact region specifying section 101.

Specifically, the receiver switching section 102 switches between the air conduction receiver 17 and the bone conduction receiver 16 depending on an area of the contact region X specified by the contact region specifying section 101. In this case, in a case where the area of the contact region X thus specified is equal to or larger than a predetermined area, the receiver switching section 102 switches to the bone conduction receiver 16. In a case where the area of the contact region X is smaller than the predetermined area, the receiver switching section 102 switches to the air conduction receiver 17.

Alternatively, the receiver switching section 102 switches between the air conduction receiver 17 and the bone conduction receiver 16 depending on a shape of the contact region X specified by the contact region specifying section 101. In this case, given patterns are stored in advance in the storing section 15 or the like in a state where each of the given patterns is associated with a corresponding one of the air conduction receiver 17 and the bone conduction receiver 16. The receiver switching section 102 switches to one of the air conduction receiver and the bone conduction receiver 16 which one is associated with, among the given patterns stored in advance in the storing section 15 or the like, a pattern that corresponds to a pattern included in the shape of the contact region X.

In a case where the receiver control section 11 switches to the bone conduction receiver 16 in the step S19, the receiver control section 11 causes the touch panel 10 to stop the scan (step S20), sets the acoustic parameter of the bone conduction receiver 16 in accordance with the adjustment value read out from the storing section 15, and then operates the bone conduction receiver 16 (step S21).

In a case where the receiver control section 11 switches to the air conduction receiver 17 in the step S19, the receiver control section 11 causes the touch panel 10 to stop the scan (step S22), sets the acoustic parameter of the air conduction receiver 17 in accordance with the adjustment value read out from the storing section 15, and operates the air conduction receiver 17 (step S23).

After operating the bone conduction receiver 16 in the step S21 or after operating the air conduction receiver 17 in the step S23, the receiver control section 11 returns to the step S13. The receiver control section 11 carries out such a loop operation every predetermined time. Note that an interval between loop operations can be changed as necessary.

In the present embodiment, the contact region is determined in accordance with the area or the shape of the contact region. Note, however, that it is usual that a way of holding the receiver device 1 varies depending on the user A. Therefore, a learning function, which allows a pattern of contact to be learned by input of the pattern of contact, can be provided to the receiver device 1.

Specifically, the contact region X is determined in the following manner: (i) the user sets patterns in advance in a state where each of the patterns is associated with a corresponding one of the bone conduction receiver 16 and the air conduction receiver 17; (ii) a pattern included in the contact region X obtained by the scan of the touch panel 10 is specified; and (iii) one of the bone conduction receiver 16 and the air conduction receiver 17 is set which one is associated with, among the patterns set in advance, a pattern that corresponds to the pattern thus specified.

Note that, in the present embodiment, the bone conduction receiver function and the air conduction receiver function realized by the receiver device 1 are realized by the bone conduction receiver 16 and the air conduction receiver 17, respectively. Alternatively, both of the bone conduction receiver function and the air conduction receiver function can be realized by an identical receiver.

Note also that, in the present embodiment, while the user is receiving a phone call, a timing at which the touch panel 10 starts a scan is determined in accordance with a distance between the user A and the receiver device 1, which distance is measured by the proximity sensor 13, so as to suppress an increase in electric power consumed by the touch panel 10. However, the present invention is not limited to such. The touch panel 10 can alternatively start a scan in synchronization with the fact that the user sets the receiver device 1 to a state where the user can receive a phone call.

As has been described, the receiver device 1 is configured such that the proximity sensor 13 measures a distance between the receiver device 1 and the user A. In a case where the distance thus measured is less than the threshold, the touch panel 10 measures an area of a contact region X of the receiver device 1 which region is in contact with the user A. Depending on the area of the contact region X thus measured, the bone conduction receiver 16 and the air conduction receiver 17 are switched.

In a case where the area of the contact region X thus measured is equal to or larger than the predetermined area, it is determined that the user A intends to use the bone conduction receiver 16. Accordingly, the bone conduction receiver 16 is then operated In a case where the area of the contact region X is smaller than the predetermined area, it is determined that the user A intends to use the air conduction receiver 17. Accordingly, the air conduction receiver 17 is then operated.

The bone conduction receiver 16 and the air conduction receiver 17 are thus switched with the use of a scanning operation carried out by the touch panel 10.

Since the receiver device 1 is assumed to be a smartphone in the present invention, the touch panel 10 is provided to the receiver device 1 as standard equipment. Therefore, according to the present invention, it is not necessary to further provide particular equipment to the receiver device 1.

Moreover, since the touch panel 10 is turned on or off with the use of the proximity sensor 13, it is possible to suppress electric power consumption and accordingly possible to prolong driving time of the receiver device 1, as compared with a case where a scan of the touch panel 10 is always carried out.

In recent years, some receiver device has an anti-noise-cancellation function for eliminating an ambient noise so that a received sound is easily audible in a case where an air conduction receiver is used.

By arranging such a receiver device so that the anti-noise-cancellation function is turned off in a case where the user listens to a bone conduction sound, it is possible to (i) use noise cancellation in a case where the user listens to an air conduction sound and (ii) suppress mixing of a vain noise in a case where the user listens to a bone conduction sound.

SUMMARY

A receiver device 1 in accordance with an aspect of the present invention is capable of switching between (i) an air conduction receiver function (air conduction receiver 17) for causing a user A to receive a phone call by air conduction and (ii) a bone conduction receiver function (bone conduction receiver 16) for causing the user A to receive the phone call by bone conduction, including: a receiver member (touch panel 10) which sets the receiver device 1 to a state where the user A can receive the phone call by use of the air conduction receiver function (air conduction receiver 17) or the bone conduction receiver function (bone conduction receiver 16), in a case where the user A brings the receiver device 1 into contact with a vicinity of a user A's ear "a"; and a receiver control section 11 including: a contact region specifying section 101 which specifies a contact region of the receiver member (touch panel 10) which region is in contact with the user A, while the receiver device 1 is being set, by the receiver member (touch panel 10), to the state where the user A can receive the phone call; and a receiver function switching section (receiver switching section 102) which switches to one of the air conduction receiver function (air conduction receiver 17) and the bone conduction receiver function (bone conduction receiver 16) which one is associated with the contact region specified by the contact region specifying section 101.

According to the above configuration, the receiver function switching section switches to one of the air conduction receiver function (air conduction receiver 17) and the bone conduction receiver function (bone conduction receiver 16) which one is associated with the contact region specified by the contact region specifying section 101, that is, a region of the receiver member which region is in contact with the vicinity of the user's ear. It is therefore possible for the user to use an intended one of the receivers merely by bringing the receiver member (touch panel 10) into contact with the vicinity of the user's ear.

In this case, it is possible for the user to easily and absolutely use the intended one of the receivers merely by understanding a relationship between contact regions and the receivers. That is, it is possible to suitably switch, with a simple configuration, between the function for causing the user to listen to a bone conduction sound (bone conduction receiver) and the function for causing the user to listen to an air conduction sound (air conduction receiver).

In addition, since the function for causing the user to listen to the bone conduction sound and the function for causing the user to listen to the air conduction sound are individually realized, it is possible to suitably set the acoustic parameter of each of the receivers in advance.

Therefore, according to the receiver device, with the simple configuration, it is possible to properly switch between (i) the function for causing the user to listen to the bone condition sound (bone conduction receiver) and (ii) the function for causing the user to listen to the air conduction receiver (air conduction receiver), and possible to set each of the functions so that the user can easily listen to a sound.

The receiver device 1 in accordance with an aspect of the present invention is arranged such that the receiver function switching section (receiver switching section 102) switches to the one of the air conduction receiver function (air conduction receiver 17) and the bone conduction receiver function (bone conduction receiver 16) which one is associated with an area of the contact region specified by the contact region specifying section 101.

According to the above configuration, the receiver function switching section switches to one of the air conduction receiver function (air conduction receiver 17) and the bone conduction receiver function (bone conduction receiver 16) which one is associated with the area of the contact region specified by the contact region specifying section 101, that is, a region of the receiver member which region is in contact with the vicinity of the user's ear. It is therefore possible for the user to use an intended one of the receivers merely by bringing the receiver member (touch panel 10) into contact with the vicinity of the user's ear.

Here, the receiver function switching section determines whether the area of the contact region X is equal to or larger than a predetermined area. In a case where the area of the contact region X is equal to or larger than the predetermined area, the receiver function switching section activates the bone conduction receiver 16. In a case where the area of the contact region is smaller than the predetermined area, the receiver function switching section activates the air conduction receiver 17.

The receiver device 1 in accordance with an aspect of the present invention is arranged such that the receiver function switching section (receiver switching section 102) switches to the one of the air conduction receiver function (air conduction receiver 17) and the bone conduction receiver function (bone conduction receiver 16) which one is associated with a shape of the contact region specified by the contact region specifying section 101.

According to the above configuration, the receiver function switching section switches to one of the air conduction receiver function (air conduction receiver 17) and the bone conduction receiver function (bone conduction receiver 16) which one is associated with the shape of the contact region specified by the contact region specifying section 101, that is, a region of the receiver member which region is in contact with the vicinity of the user's ear. It is therefore possible for the user to use an intended one of the receivers merely by bringing the receiver member (touch panel 10) into contact with the vicinity of the user's ear.

In this case, the receiver function switching section switches to one of the receivers which one is associated with a shape that is determined, among a plurality of shapes registered in advance, as being similar to the shape of the contact region X which shape is formed by coordinates included in the contact region X. Here, for example, in a case where 80% or more of the coordinates included in the contact region X match with coordinates of any one of the plurality of shapes registered in advance, it is determined that the any one of the plurality of shapes is similar to the shape of the contact region X.

As the plurality of shapes registered in advance, it is preferable to employ shapes which are obtained from contact regions detected (i) in a case where the user, who is to use the receiver device 1, actually brings the touch panel into contact with the vicinity of the user's ear so that the bone conduction receiver 16 is in use and (ii) in a case where the user actually brings the touch panel into contact with the vicinity of the user's ear so that the air conduction receiver 17 is in use.

The receiver device 1 in accordance with an aspect of the present invention is arranged such that the receiver switching section (receiver switching section 102) switches to one of the air conduction receiver function (air conduction receiver 17) and the bone conduction receiver function (bone conduction receiver 16) which one is associated with a pattern included in the contact region X specified by the contact region specifying section 101.

The receiver device 1 in accordance with an aspect of the present invention is arranged such that the receiver member is a touch panel.

According to the above configuration, in a case where the receiver member is a touch panel, it is not necessary to separately provide a particular member, for switching the receivers, to the receiver device provided with the touch panel, for example, a smartphone.

The receiver device 1 in accordance with an aspect of the present invention further includes a proximity sensor which detects proximity of the user to the receiver member, the receiver member setting the receiver device to the state where the user can receive the phone call, in a case where a value detected by the proximity sensor is equal to or less than a predetermined value.

According to the above configuration, in a case where the value detected by the proximity sensor, that is, a distance between the user and the receiver member is equal to or less than the predetermined value, the receiver device is set to the state where the user can receive the phone call. It is therefore possible to suppress electronic power consumed by the receiver member.

In particular, according to a smartphone and the like, the touch panel is often used as the receiver member. In a case where electric power consumed by the touch panel can be suppressed, this leads to a reduction in electric power consumed by the device as a whole. Therefore, thus controlling activation of the receiver member with the use of the proximity sensor is extremely efficient.

The present invention can be implemented by a receiver control program which causes a computer to function as each section of the receiver control section of the receiver device.

The receiver control program can be recorded in a computer-readable recording medium.

In this case, the present invention can be realized by a general-purpose computer.

The present invention is not limited to the description of the embodiments, but may be altered by a skilled person in the art within the scope of the claims. An embodiment derived from a proper combination of technical means disclosed in different embodiments is also encompassed in the technical scope of the present invention. Furthermore, by a combination of technical means disclosed in different embodiments, a new technical feature can be derived.

[Software Implementation Example]

Each block of the receiver device 1, particularly, the receiver control section 11 can be implemented by hardware such as a logic circuit provided on an integrated circuit (IC chip) or can alternatively be implemented by software with the use of a CPU (Central Processing Unit).

In the latter case, the receiver device 1 includes: a CPU that executes instructions of a program that carries out the foregoing functions; and a storage device (recording medium) such as a ROM (Read Only Memory) that stores the program, a RAM (Random Access Memory) in which the program is loaded, and a memory that stores the program and various sets of data. The object of the present invention can be attained by (i) supplying, to the receiver device 1, the recoding medium in which program codes (an executable program, an intermediate code program, and a source program) of a program for controlling the receiver device 1, which is implemented by software that executes the foregoing functions, are computer-readably recorded and (ii) causing a computer (or a CPU or an MPU) of the receiver device 1 to read and execute the program codes recorded in the recording medium.

Examples of the recording medium includes non-transitory tangible mediums, for example, (i) tapes such as a magnetic tape and a cassette tape; (ii) disks including magnetic disks, such as a floppy (Registered Trademark) disk and a hard disk, and optical disks, such as a CD-ROM, an MO, an MD, a DVD, and a CD-R; (iii) cards such as an IC card (including a memory card) and an optical card; (iv) semiconductor memories such as a mask ROM, EPROM, EEPROM (Registered Trademark), and a flash ROM; and (v) logic circuits such as a PLD (Programmable Logic Device) and an FPGA (Field Programmable Gate Array).

The receiver device 1 can be connected to a communication network so that the program codes are supplied to the receiver device 1 via the communication network. This communication network is not limited to any particular one, provided that the program codes can be transmitted. Examples of the communication network include the Internet, an intranet, an extranet, a LAN, ISDN, a VAN, a CATV communications network, a virtual private network, a telephone network, a mobile telecommunications network, and a satellite communication network. Further, a transmission medium by which the communication network is constituted is not limited to any particular one, provided that the program codes can be transmitted. Examples of the transmission medium include: wired transmission media such as IEEE1394, a USB, a power-line carrier, a cable TV circuit, a telephone line, and ADSL (Asymmetric Digital Subscriber Line); and wireless transmission media such as infrared communication systems such as IrDA and a remote control, Bluetooth (Registered Trademark), IEEE802.11 wireless communication system, HDR (High Digital Rate), NFC (Near Field Communication), DLNA (Digital Living Network Alliance), a mobile phone network, a satellite circuit, and a digital terrestrial network. Note that the present invention can also be implemented in a form of a computer data signal in which the program codes are embodied by an electronic transmission and which is embedded in carrier waves.

INDUSTRIAL APPLICABILITY

The present invention can be suitably applied to a receiver device including (i) an air conduction receiver for causing a user to receive a phone call by air conduction and (ii) a bone conduction receiver for causing the user to receive a phone call by bone conduction, in particular, a communication mobile terminal including a touch panel.

REFERENCE SIGNS LIST

1 Receiver device
10 Touch panel (receiver member)
11 Receiver control section
13 Proximity sensor
16 Bone conduction receiver (bone conduction receiver function)
17 Air conduction receiver (air conduction receiver function)
101 Contact region specifying section
102 Receiver switching section (receiver function switching section)
105 Distance determining section
A User
"a" Ear
X Contact region

The invention claimed is:

1. A receiver device capable of switching between (i) an air conduction receiver function for causing a user to receive a phone call by air conduction and (ii) a bone conduction receiver function for causing the user to receive the phone call by bone conduction, comprising:

a receiver member which sets the receiver device to a state where the user can receive the phone call by use of the air conduction receiver function or the bone conduction receiver function, in a case where the user brings the receiver device into contact with a vicinity of a user's ear; and a receiver control section including: a contact region specifying section which specifies a contact region of the receiver member which region is in contact with the user, while the receiver device is being set, by the receiver member, to the state where the user can receive the phone call; and a receiver function switching section which switches to one of the air conduction receiver function and the bone conduction receiver function which one is associated with the contact region specified by the contact region specifying section.

2. The receiver device as set forth in claim 1, wherein the receiver function switching section switches to the one of the air conduction receiver function and the bone conduction receiver function which one is associated with an area of the contact region specified by the contact region specifying section.

3. The receiver device as set forth in claim 1, wherein the receiver function switching section switches to the one of the air conduction receiver function and the bone conduction receiver function which one is associated with a shape of the contact region specified by the contact region specifying section.

4. The receiver device as set forth in claim 1, wherein the receiver member is a touch panel.

5. The receiver device as set forth in claim 1, further comprising:

a proximity sensor which detects proximity of the user to the receiver member, the receiver member setting the receiver device to the state where the user can receive the phone call, in a case where a value detected by the proximity sensor is equal to or less than a predetermined value.

6. The receiver device as set forth in claim 1, wherein:

the receiver member is a touch panel; and the contact region specifying section specifies a contact region of the touch panel that is in contact with the user, by causing the touch panel to start a scan, while the receiver device is being set, by the receiver member, to the state where the user can receive the phone call.

* * * * *